Oct. 11, 1960

A. E. TÖRNVALL 2,955,355

HAIR-TRIMMING IMPLEMENTS

Filed June 4, 1958

Inventor:
Anton E. Törnvall.

United States Patent Office 2,955,355
Patented Oct. 11, 1960

2,955,355

HAIR-TRIMMING IMPLEMENTS

Anton Evert Törnvall, Rosenlundsgatan 12, Malmö S, Sweden

Filed June 4, 1958, Ser. No. 739,706

2 Claims. (Cl. 30—30)

The present invention relates to hair-trimming implements, and has for its object to provide a hair-trimming implement enabling everybody in a convenient manner to trim away minor irregularities on one's coiffure, for instance at the temples, at the back of one's head and at the hair-edge of the neck, as well as to be used for removing hair from one's arms and legs.

The implement contemplated comprises a generally flat elongated member or bar having rows of interspaced teeth extending along portions of its longitudinal edges, the teeth disposed at one longitudinal edge of the bar being materially shorter in length than those disposed at the opposite longitudinal edge of the same. Attachable to the top face of the generally flat bar is a cutting blade, or two mutually overlapping blades, such as razor blades, having cutting edges as two opposite longitudinal edges, and disposed with these cutting edges extending in slightly spaced parallel relation to, and inwardly of, the tips of said rows of teeth, respectively. To be attached in superimposed relation to said cutting blade or blades is a comb-like member having its teeth directed towards one or, alternatively, the other of the longitudinal edges of the generally flat bar.

When using the implement for trimming one's hair, it is possible by employing one or the other lateral edge of the generally flat bar and possibly turning the implement with its comb-like member either facing the hair or turned away from the hair, to perform both coarse-trimming and medium-fine trimming as well as fine-trimming of one's hair in a convenient manner.

Further features and advantages of the invention will appear from the following description thereof in conjunction with the accompanying drawing illustrating by way of example a preferred embodiment of the invention, and in which.

Figure 4:
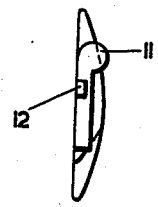
Fig. 4 is a cross section taken along the line IV—IV in Fig. 2.

Referring to the drawing more specifically, the implement illustrated comprises a generally flat elongated member or bar 1, made of any suitable material, such as plastic, one of its faces being flat whereas its opposite face is slightly convex (Fig. 4). A middle portion 2 of the bar 1 is enlarged in the transverse direction of the bar and has mutually parallel lateral edges. These lateral edges are integrally formed with rows of teeth 3 and 4, respectively, the teeth 3 being materially longer than the teeth 4. On the plane surface of the bar 1 the middle portion 2 thereof is provided with four accurately positioned and interspaced cylindrical bosses 7 adapted to engage corresponding complementary recesses 8 formed in a plate member 5 loosely disposed close to the flat surface of the middle portion 2 of the bar 1 and formed along one of its lateral edges with a row of comb-teeth 6 which project beyond one lateral edge of the middle-portion 2, as well as beyond the row of teeth 4 formed integrally with the last-mentioned edge, as seen in Fig. 1.

The comb-like plate member 5 is formed at its ends with resilient arms 11 bent at right angles so as to extend for their main part transversely of the generally flat implement. Each arm 11 is provided on its side facing the adjacent end of the bar 1 with a chamfered lug 12 adapted to be snapped into, and resiliently maintained in engagement with, a mating recess 13 made in a raised portion 14 of the bar 1, respectively, thus to retain the plate member 5 reliably in position. Interposed between the bar 1 and the plate 5 are two mutually overlapping cutting blades having ground cutting edges at two opposite longitudinal edges thereof, such as razor blades 9, 10, which are retained in position by the bosses 7, the latter being passed through two holes of the blades.

Figure 1:
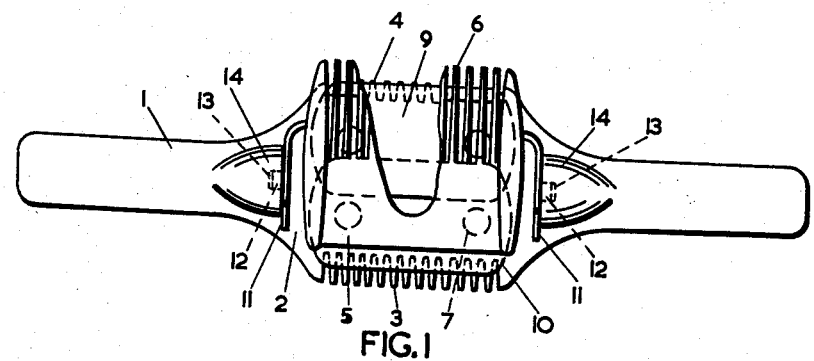
Figs. 1 and 2 are plan views of the implement having its comb-like member disposed in two different positions, respectively.

Fig. 1 shows the trimmer having its comb-like plate 5 disposed in a position for coarse-trimming of the hair which operation is carried out with that lateral edge of the trimmer at which the comparatively long teeth 6 of the plate 5 are disposed. Using the opposite lateral edge of the trimmer, it is possible thereafter to perform medium-fine trimming without changing the position of the plate 5, in that the spacing of the tips of teeth 3 from the adjacent cutting edge is somewhat shorter than the spacing of the tips of the teeth 6 from the cutting edge adjacent to these teeth. For coarse-trimming the plate 5 should face the hair whereas for medium-fine trimming the same should be turned away from the hair.

Figure 2:
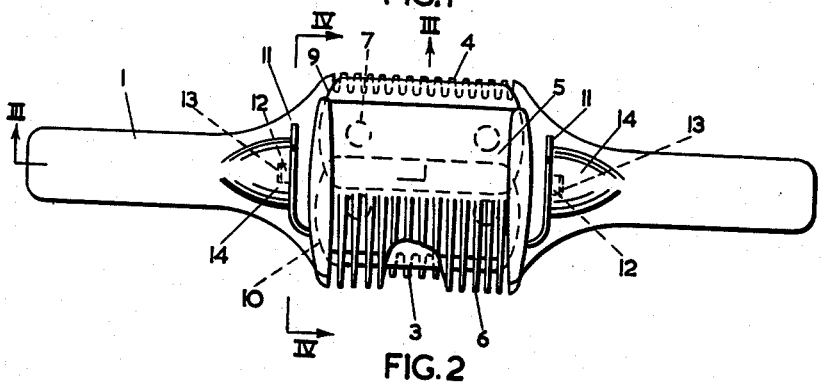
Figure 3:
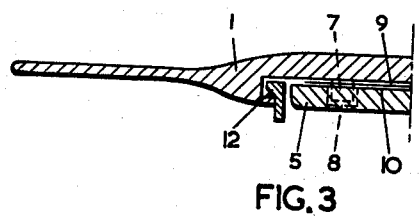
Fig. 3 is a longitudinal section through one half of the implement, and taken along the line III—III in Fig. 2.

Fig. 2 illustrates the implement with its comb-like plate 5 set for fine-trimming of the coiffure, or for hair-removal, for instance at one's neck. Fine-trimming is to be performed with the upper lateral edge of the implement (as seen in Fig. 2) at which the spacing of the tips of the teeth 4 from the adjacent cutting edge is quite small.

As will be seen from the drawing, the tooth spaces of the bar 1 and those of the comb-like plate merge into flutes formed in the material of the bar 1 and plate 5, respectively.

What is claimed is:

1. A hair trimming implement comprising a generally flat elongated bar having a row of spaced teeth positioned along each of two opposed parallel longitudinal edges, the teeth disposed along one such edge being shorter than the teeth disposed along the other such edge, blade means positioned flat against one face of the bar, said blade means having two opposed parallel cutting edges, means on the bar to engage with said blade means for locating the said blade means in a position on the bar in which one such cutting edge lies along in slightly spaced relation to the shorter teeth, said one edge being parallel to the tips of said shorter teeth and at a predetermined distance from their tips, the other such cutting edge lying along in slightly spaced relation to the longer teeth and being parallel to the tips of said longer teeth and at a greater distance than said predetermined distance from their tips, a comb plate including a row of teeth formed along one longitudinal edge thereof, and means for the releasable retention of said comb plate on the bar so as to be superposd to the blade means selectively in one of two positions obtainable by rotating the comb plate through 180° about a central axis normal to its plane, the teeth of the comb plate in one of said positions lying parallel to and extending beyond the shorter teeth of the bar and in the other of said positions lying parallel to and extending beyond the longer teeth of the bar, 2. A hair trimming implement comprising a generally flat elongated bar having a row of spaced teeth positioned along each of two opposed parallel edges, the teeth disposed along one such edge being shorter than the teeth disposed along the other such edge, said bar having on one face two raised portions symmetrically spaced longitudinally of the bar respectively beyond the ends of the rows of teeth, said raised portions including opposed recesses, blade means positioned flat against said face of the bar, said blade means having two opposed parallel cutting edges, means on the bar to engage with said blade means for locating the said blade means in a position on the bar in which one such cutting edge lies along and in slightly spaced relation to the shorter teeth of the bar, said one edge being parallel to the tips of said shorter teeth and at a predetermined distance from their tips, the other such cutting edge lying along in slightly spaced relation to the longer teeth of the bar and being parallel to the tips of said longer teeth and at a greater distance than said predetermined distance from their tips, a comb plate including a row of teeth formed along one longitudinal edge thereof, and two resilient catch elements mounted one on each lateral edge of the comb plate and each including an outwardly facing lug for engagement into one of the recesses of the raised portions of the bar, said catch means serving to retain the comb plate releasably on the bar selectively in one of two positions obtainable by rotating the comb plate through 180° about a central axis normal to its plane, the teeth of the comb plate in one of said positions lying parallel to and extending beyond the shorter teeth of the bar and in the other of said positions lying parallel to and extending beyond the longer teeth of the bar.

References Cited in the file of this patent

UNITED STATES PATENTS

| | | |
|---|---|---|
| 1,951,775 | Seilaz | Mar. 20, 1934 |
| 2,746,144 | Spanel | May 22, 1956 |

FOREIGN PATENTS

| | | |
|---|---|---|
| 967,999 | France | Nov. 16, 1950 |